United States Patent
Duquesne et al.

(10) Patent No.: US 9,815,398 B2
(45) Date of Patent: Nov. 14, 2017

(54) CROP UNLOADING SPOUTS

(71) Applicant: CNH Industrial America LLC, New Holland, PA (US)

(72) Inventors: Frank R. G. Duquesne, Zwevegem (BE); Pieter Vandevelde, Sint Michiels Brugge (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/088,889

(22) Filed: Apr. 1, 2016

(65) Prior Publication Data

US 2016/0286724 A1    Oct. 6, 2016

(30) Foreign Application Priority Data

Apr. 2, 2015    (BE) .................................. 2015/5208

(51) Int. Cl.
*B60P 1/42*    (2006.01)
*B65G 41/00*    (2006.01)
*A01D 41/12*    (2006.01)

(52) U.S. Cl.
CPC ............ *B60P 1/42* (2013.01); *A01D 41/1217* (2013.01); *B65G 41/002* (2013.01)

(58) Field of Classification Search
CPC .............. A01D 43/073; A01D 41/1217; A01D 43/087; B65G 41/002; B60P 1/42
See application file for complete search history.

(56) References Cited

U.S. PATENT DOCUMENTS

| | | | | |
|---|---|---|---|---|
| 3,251,631 A | * | 5/1966 | Hennen | A01D 43/087 193/22 |
| 3,638,812 A | | 2/1972 | Ryczek | |
| 3,825,138 A | | 7/1974 | Pool | |
| 5,359,838 A | * | 11/1994 | Madsen | A01D 43/073 56/14.9 |
| 5,558,282 A | * | 9/1996 | Ameye | A01D 43/086 241/101.742 |
| 5,575,316 A | * | 11/1996 | Pollklas | A01D 43/073 141/198 |

(Continued)

FOREIGN PATENT DOCUMENTS

| | | |
|---|---|---|
| CN | 202455836 U | 10/2012 |
| CN | 202773381 U | 3/2013 |

(Continued)

*Primary Examiner* — Kaitlin Joerger
(74) *Attorney, Agent, or Firm* — Patrick M. Sheldrake

(57) ABSTRACT

A harvesting machine crop unloading spout assembly includes an unloading tube elbow terminating at a first end in a first flange that is secured to the outlet of a harvesting machine crop tank. The first flange includes one or more bearings permitting it to swivel about a swivel axis and the unloading tube elbow includes a cranked portion terminating at a second end in an opening. The spout assembly further includes a fixed member adjacent the unloading tube elbow, the unloading tube elbow connected to the fixed member by way of a pivot the axis of which coincides with the swivel axis. The spout assembly includes a rotatable drive gear and a motor drivingly engaged therewith for causing rotation of the unloading tube elbow about the swivel axis, the axis of rotation of the drive gear also coinciding with the swivel axis.

9 Claims, 3 Drawing Sheets

(56) References Cited

U.S. PATENT DOCUMENTS

| | | | |
|---|---|---|---|
| 6,247,886 B1 | 6/2001 | Signer et al. | |
| 6,484,485 B2 | 11/2002 | Dillon | |
| 6,718,746 B2 * | 4/2004 | Hettiger | A01D 43/087 |
| | | | 37/261 |
| 7,367,881 B2 | 5/2008 | Voss et al. | |
| 8,147,176 B2 | 4/2012 | Coers et al. | |
| 8,186,497 B2 | 5/2012 | Mackin et al. | |
| 8,398,469 B2 | 3/2013 | Coers et al. | |
| 8,696,292 B2 * | 4/2014 | Dulong | A01F 12/46 |
| | | | 198/312 |
| 2016/0031659 A1 * | 2/2016 | Boston | A01C 7/208 |
| | | | 414/523 |

FOREIGN PATENT DOCUMENTS

| | | |
|---|---|---|
| CN | 203633158 U | 6/2014 |
| CN | 203646065 U | 6/2014 |
| DE | 19802199 A1 | 7/1999 |
| DE | 19951825 A1 | 5/2001 |
| EP | 0129611 A1 | 1/1985 |
| FR | 2047902 A1 | 3/1971 |
| FR | 2083946 A5 | 12/1971 |
| FR | 2518362 A1 | 6/1983 |

* cited by examiner

CROP UNLOADING SPOUTS

CROSS REFERENCE TO RELATED APPLCIATION

This application claims priority to Belgium Application BE2015/5208 filed Apr. 2, 2015, which is incorporated herein by reference in its entirety.

FIELD OF THE INVENTION

The invention relates to crop unloading spouts of harvesting machines, such as a combine harvester.

BACKGROUND OF THE INVENTION

As is well known, a combine harvester includes a large tank that receives clean grain following its separation from contaminants and low-value crop plant parts in the operative parts of the machine.

This clean grain tank can hold a substantial amount of grain, but despite this the storage capacity of the machine is considerably less than the quantity of grain that is harvested from a typical field.

In consequence it is necessary to empty the grain tank periodically while a combine harvester works to harvest a field. It is however for various reasons (including the inefficiency associated with interrupting harvesting activity) not desirable to halt the combine harvester while unloading of grain from the grain tank takes place.

Instead it is commonplace for a tractor to tow a large grain trailer alongside a combine harvester, and for transfer of the grain from the combine harvester to the trailer to occur while the two vehicles travel adjacent one another at the same speed in a field.

A combine harvester typically is equipped with a grain unloading spout that is connected to the clean grain tank. The spout includes a swivel so it can be moved, horizontally in most combine harvester designs, from a stowed position recessed within the combine harvester to a protruding deployed position in which it overlies the open upper side of the grain trailer when unloading of the grain tank is required. Following completion of the unloading step the spout is returned to its stowed position so as not to present a hazard as the combine harvester continues to move.

In order to avoid halting of the combine harvester movement of the unloading spout between the stowed and deployed positions is effected using a powered actuator. As a result the driver of the combine harvester can command deployment and stowing of the unloading spout, using appropriate cab-mounted controls, without leaving the cab or even slowing the combine harvester during harvesting activity.

The unloading spout in a prior art combine harvester is a pipe including e.g. a 90° elbow adjacent a flange including a swivel via which the spout is secured covering an aperture formed in the clean grain tank. A hydraulic actuator interconnects, via respective pivotable connections at each end, the wall of the unloading spout and a part of the combine harvester that is fixed relative to the clean grain tank.

Energising of the hydraulic actuator in one prior art arrangement so it contracts causes the unloading spout to move from the stowed position to the protruding position; and energising the actuator so it extends (or de-energising the actuator if it is spring-biased) causes movement of the unloading spout in the opposite direction, towards the stowed position.

In another known combine harvester an unload tube swings open when a cylinder is extended; and it swings to its storage position when the cylinder is retracted.

The first of these types of prior art arrangement is summarised in FIG. 1, which shows an unloading spout assembly 10 of which an unloading spout is constituted primarily by a hollow metal (e.g. cast/metal sheet) unloading tube 11 formed to include an approximately 90° unloading elbow 12 as illustrated.

At one end the unloading tube 11 terminates in a circular first flange 13 including a swivel bearing that is not visible in FIG. 1. The first flange 13 is secured in mating relationship with a tank flange 14 defining the boundary of a circular opening formed in the top side of a clean grain tank 16 of a combine harvester. The circular first flange 13 and the tank flange 14 are rotatably captive one relative to the other with the swivel bearing acting between them. As a result the unloading tube 11 may be swung essentially horizontally from the stowed position illustrated in FIG. 1 to a deployed position in which it protrudes outwardly from the top of the clean grain tank.

The unloading tube 11 is stabilised at its upper end by a stabiliser rod 17 that is fixed at one, lower end to the unloading tube 11 by way of a boss 18 and is journalled in a support bearing at its free, upper end.

The support bearing is mounted inside a horizontally extending, hollow beam 19 that overlies the unloading tube 11. Hence the support bearing is not visible in FIG. 1.

The support bearing permits rotation of the rod 17 about an axis that generally coincides with the axis about which the unloading tube 11/elbow 12 swivels relative to the tank flange 14, thereby bracing the unloading tube 11 against lateral forces that otherwise would cause uneven loading of the swivel bearing during movement of the unloading tube between the stowed and deployed positions described.

At its otherwise free, cranked end unloading tube 11 terminates in an end flange 21 that is bolted about its periphery to a further circular flange 22 forming one end of a hollow unloading tube extension 23. The unloading tube 11 or the unloading tube extension 23 may include a powered crop-conveying arrangement such as an auger or a belt. Unloading tube extension 23 extends the length of the cranked part of unloading tube 11 and is of sufficient length as to overlie the interior of a towed trailer running alongside the combine harvester when the unloading tube 11 adopts its deployed position. As a result grain or other crop expelled from the clean grain tank 16 via the unloading tube 11 passes along the unloading tube extension 23 and into the trailer.

Movement of the unloading tube 11, and hence unloading tube extension 23, between the stowed and deployed positions is effected in a powered manner by an actuator piston 24 which typically is hydraulically operated. One end 26 of the actuator piston 24 is secured by way of a pivot mounting to the unloading tube 11. The opposite end of the piston 24 is secured by way of a similar pivot to a part of the combine harvester, such as the vehicle frame, that is fixed relative to the clean grain tank 16.

As a result of this arrangement powering of the piston 24 to contract causes movement of the unloading tube 11 and extension 23 from the stowed to the deployed position described; and powering of the piston 24 to extend causes reverse movement, from the deployed to the stowed position. As noted however other arrangements, including those in which e.g. extension of a piston causes movement of an unloading tube to a deployed position and contraction of the piston causes stowing of the unloading tube are known.

The described prior art unloading spout arrangement suffers several disadvantages the first of which is that the transmission angle between the actuator piston 24 and the unloading tube 11 alters as the unloading tube 11 moves between the stowed and deployed positions. This in turn means that the actuator force acting on the unloading tube 11 and extension 23 is not constant.

This is illustrated in FIG. 2, in which the actuator force lever in mm (i.e. the perpendicular lever arm in mm, corresponding to the amount of torque that can be generated with a given force) (y-axis) is plotted against the length of the actuator in mm at points between the fully stowed and fully deployed positions.

It is apparent from FIG. 2 that the force lever applied by the actuator piston 24 is not constant, and is lower at the start and end of its motion than in a middle zone of movement. This in turn means that in order to achieve an acceptable average force lever value the actuator piston must in effect be over-specified with the result that the cost, size, weight and power consumption of the actuator piston are unacceptably high.

Also a special reaction bar 25 is needed for heavy duty unloading tubes to compensate for the high force the actuator generates. The reaction forces resulting from operation of the actuator in such circumstances can distort the shape of the grain tank.

SUMMARY OF THE INVENTION

In a broad aspect there is provided a harvesting machine crop unloading spout assembly comprising an unloading tube elbow terminating at a first end in a first flange that is secured to the outlet of a harvesting machine crop tank, the first flange including one or more bearings permitting the unloading tube elbow to swivel about a swivel axis and the unloading tube elbow including a cranked portion terminating the unloading tube elbow at a second end in an opening, the spout assembly further including a fixed member that lies adjacent the unloading tube elbow; and the unloading tube elbow being connected to the fixed member by way of a pivot the axis of which coincides with the swivel axis, characterised in that the spout assembly includes a rotatable drive gear and a motor drivingly engaged therewith for causing rotation of the unloading tube elbow about the swivel axis, the axis of rotation of the drive gear also coinciding with the swivel axis.

Such an arrangement advantageously includes a drive arrangement, for moving an unloading spout between stowed and deployed positions, that transmits an even turning moment to the unloading spout assembly regardless of the angular position of the latter; and that is subject to no limit as to the extent to which the unloading spout may be rotated from its stowed position. In turn this means that the unloading spout may be rotated over a larger arc than is possible with the described prior art actuator pistons, the lengths of which limit the movement range of the unloading tube. As a result the efficiency of harvesting operations is improved.

Preferably the pivot includes a pivot shaft that is fixed to the unloading tube elbow and is journalled relative to the fixed member; and the drive gear is a pinion that is fixed to the pivot shaft. Such an arrangement is advantageously compact, and makes use of the fixed member in the form of a beam and the associated rod that are present in prior art unloading spouts.

Conveniently the fixed member is hollow and the pinion lies inside the fixed member. This aspect of the invention further assures compactness of the arrangement, and also helps to avoid contamination of and damage to the parts that impart drive to the unloading tube and any extension attached to it.

Further preferably the motor includes one or more output gears that are meshingly engaged with the pinion; and optionally the motor is or may include a double-acting hydraulic rotary actuator. These aspects of the arrangement of the invention permit the drive to be embodied as a rack and pinion combination. Such a design is strong and accurate in use.

In an embodiment of the invention the rotary actuator is a dual-piston actuator. However single-piston actuators are possible within the scope of the invention, as are numerous other actuator types.

In a further embodiment of the invention the fixed member is a beam that overlies the unloading tube elbow. Thus the fixed member may readily be constituted as only a very mildly modified version of the beam 19 of FIG. 1. However in other embodiments of the invention stabilising of the motion of the unloading tube relative to the clean grain tank (or equivalent structure) may be achieved in other ways as will occur to the person of skill in the art.

In an alternative embodiment of the invention to that in which the pinion is within a fixed member such as a beam overlying the unloading tube elbow the drive gear optionally may extend about a periphery of the unloading tube elbow. In particular the drive gear may be configured as a crown-wheel extending about the first flange.

Such an arrangement may, by reason of the increased diameter of the unloading tube elbow being larger compared to the pivot shaft, apply a greater torque to the unloading tube elbow than the pinion that is concealed within the fixed member; although the torque applied by the pinion also is adequate, without a need for a reduction gear, to cause rotation of the unloading tube elbow and any attached extension over a wide angular range.

The invention is also considered to reside in a harvesting machine (especially a combine harvester, although the principles of the invention are useable in other harvester types) incorporating a crop unloading spout assembly as defined herein.

BRIEF DESCRIPTION OF THE DRAWINGS

There now follows a description of embodiments of the invention, by way of non-limiting example, with reference being made to the accompanying drawings in which:

FIG. 3 shows in perspective view one arrangement of an unloading spout assembly 10' in accordance with the invention.

DETAILED DESCRIPTION OF THE INVENTION

Figure 1:
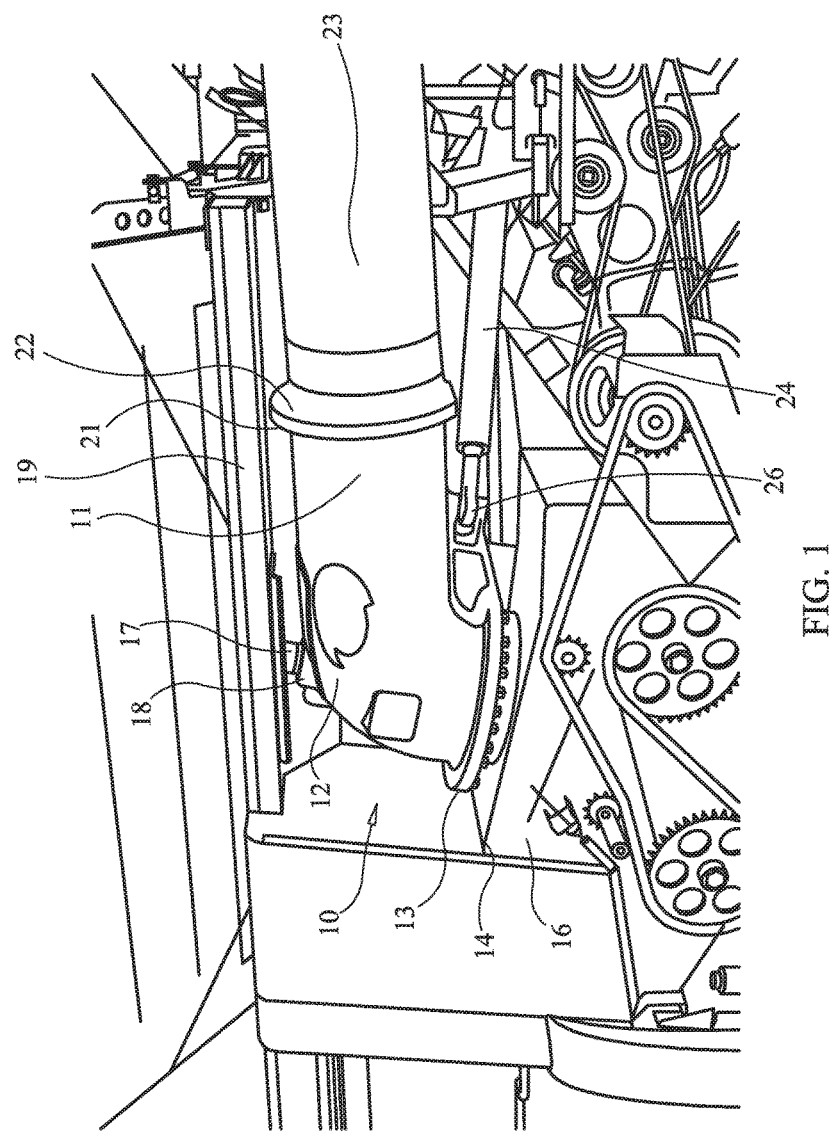
FIG. 1 is a perspective view of a prior art unloading spout assembly.
Figure 2:
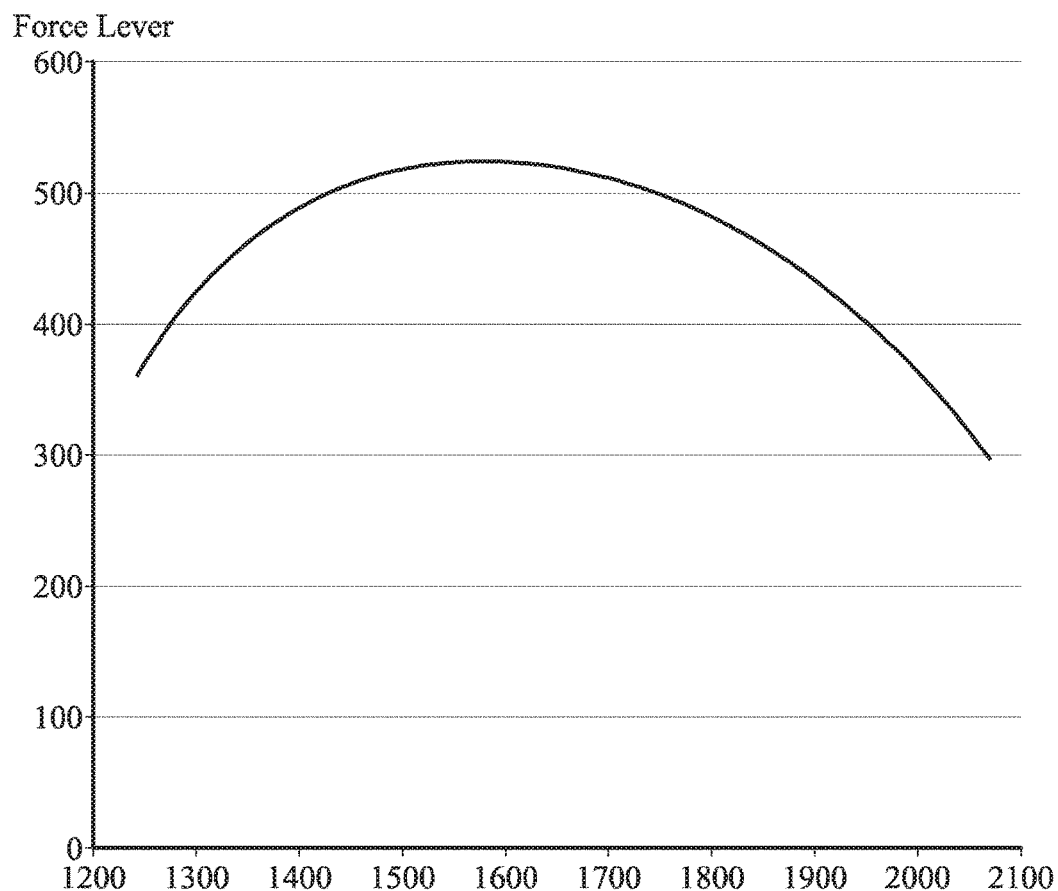
FIG. 2 is a plot of the force lever applied by the actuator visible in FIG. 1 against the extension of the actuator.
Figure 4:
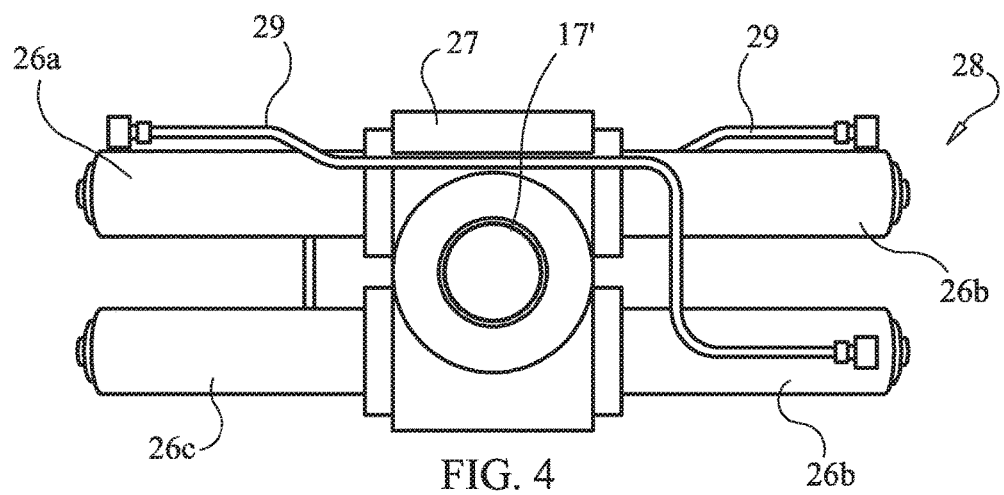
FIG. 4 shows an actuator that is suitable for incorporation into the beam of FIG. 4, and including a pinion and rack drive arrangement.
Figure 3:
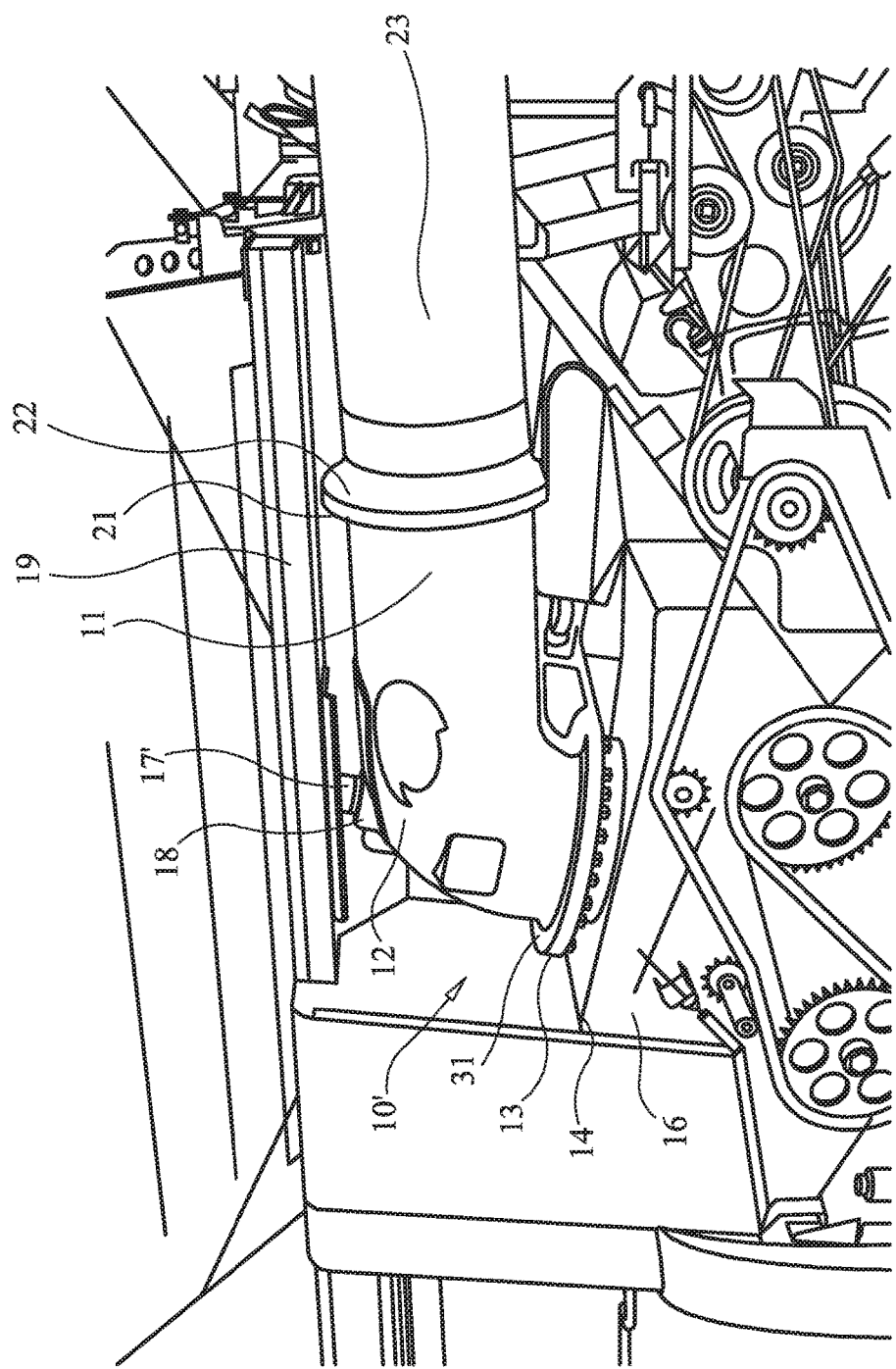
FIG. 3 is a perspective view, that is similar to FIG. 1, showing one embodiment of the invention and indicating a possible position for a crownwheel of an alternative embodiment.

In FIG. 3 the majority of the components are the same as the counterpart components of FIG. 1, and are identified using the same reference numerals. Thus the unloading tube 11, elbow 12, first flange 13, tank flange 14, clean grain tank 16, boss 18, beam 19, end flange 21, further flange 22 and unloading tube extension 23 in the FIG. 4 embodiment are unchanged from the components shown in FIG. 1. This however need not necessarily be so, and in other embodiments of the invention some or all such components may adopt modified forms, may be absent entirely or may be substituted by different components.

The arrangement of FIG. 3 differs from that of FIG. 1 in that the actuator piston 24 and its associated pivoting mounts at either end are not required. Also the reaction bar can be omitted. Instead rotary drive causing selective rotation of the unloading tube elbow 12 and associated unloading tube extension 23 is provided by a motor in the form of a rotary actuator 28 (see FIG. 4 i.e. a motor and rotary drive gear combination) that is mounted inside the hollow interior of a fixed member in the form of beam 19 that is fixedly coupled to or part of the combine chassis and acts on a pinion formed in the upper end of a modified version 17' of the stabiliser rod of FIG. 1.

Stabiliser rod 17' of FIG. 3 is journalled near its upper end in a bearing supported by the boss 18, as in the arrangement of FIG. 1, and may be considered as a pivot shaft. The upper end of the rod 17' includes fixedly secured thereto a pinion that is engaged on each side by a respective toothed rack forming part of rotary actuator 28. The pinion preferably is arranged to be replaceable as a service item, although in other embodiments of the invention the parts of the motor may be of a "sealed for life" type the nature of which will be familiar to the person of skill in the art.

The racks, which are not shown in the figures but which can be readily embodied by the skilled worker, are secured to the output shafts of a pair (in the embodiment shown, although a single actuator version of the invention is also possible) of hydraulic linear actuators that are also located on opposite sides of the rod 17' by way of being secured extending parallel to one another as illustrated in cylindrical housings 26a, 26b, 26c, 26d.

The cylindrical housings 26a, 26b extend from opposite ends of a cuboidal gearbox 27 inside which the pinion is held rotatably captive by reason of the aforesaid journalling of the rod 17'. The housings 26a, 26b are off-centre with respect to the sides of the gearbox 27 from which they extend.

The cylindrical housings 26c, 26d extend similarly from the same sides of the gearbox respectively as housings 26a, 26b, with the difference that they are offset to the opposite side of the centre of the gearbox. The result of the arrangement is that the racks forming part of the actuator are drivingly engaged with the pinion such that longitudinal motion of the racks causes rotary motion of the pinion, and hence the rod 17'. Since the rod 17' is secured to the unloading tube 11 operation of the rotary actuator 28 causes rotation of the rod and hence of the unloading tube 11 about the swivel defined between the first flange 13 and the tank flange 14.

The rotary actuator 28 is a hydraulic actuator, although other forms of actuator (such as but not limited to electric and pneumatic actuators) are possible within the scope of the invention. The arrangement of FIG. 4 includes exemplary, non-limiting hydraulic supply pipes 29 for the purpose of providing powered, co-ordinated movement of the racks.

The control arrangement for the rotary actuator 28 assures that the racks always move in opposite directions relative to the pinion, with the result that the pinion is driven on two opposite sides simultaneously. This provides for the application of a maximal torque to the pinion and minimises the risk of jamming of the rack teeth and those of the pinion.

As mentioned a version of the rotary actuator 28 having a single linear actuator is possible within the scope of the invention. The means by which such an arrangement may be embodied will readily occur to the person of skill in the art.

The control arrangement for the apparatus of the invention could include e.g. a rotary control that is mounted on a dashboard in the cab of the combine harvester. The connection of the hydraulic pipes could be such as to cause rotation of the unloading tube elbow 11 and unloading tube extension 23 in proportion to the extent of rotation of the rotary control. Other control input means however could be provided. These could include levers, linear controls or touch screen controls as desired.

In use of the arrangement of the invention a greater range of angular movement of the unloading tube elbow 11 and attached extension 23 is possible than in the case of the FIG. 1 set-up. This solves the visibility problems of the prior art such as the described limited range of unloading tube movement and fouling of the hydraulic actuator on the exterior of the unloading tube. Furthermore the apparatus of the invention can be embodied in a compact, reliable configuration. The need to avoid any reduction gearing between the rotary actuator and the pinion minimises the risk of gear tooth backlash occurring that might introduce inaccuracy into the positioning of the unloading spout during deployment. Furthermore the torque applied to the unloading tube 11 and attached components is constant over the entire available movement range.

In an alternative embodiment of the invention the pinion could be dispensed with and the rod 17 journalled in the same way as in FIG. 1. In such an embodiment drive to rotate the unloading tube 11 and extension 23 could be provided by a crownwheel mounted e.g. on the first flange 13 (i.e. about a periphery of the unloading tube elbow 12) as indicated approximately by reference numeral 31. In such an embodiment of the invention the rotary actuator 27 would be replaced by a different type of drive, such as a powered gearwheel or a toothed rack the teeth of which are meshed with the crownwheel teeth in order to provide for the generation of rotary motion of the unloading tube 11. Such an arrangement can be controlled in similar ways to those explained in relation to the illustrated embodiment.

Preferences and options for a given aspect, feature or parameter of the invention should, unless the context indicates otherwise, be regarded as having been disclosed in combination with any and all preferences and options for all other aspects, features and parameters of the invention.

The listing or discussion of an apparently prior-published document in this specification should not necessarily be taken as an acknowledgement that the document is part of the state of the art or is common general knowledge.

The invention claimed is:

1. A harvesting machine crop unloading spout assembly comprising an unloading tube elbow terminating at a first end in a first flange configured to be secured to an outlet of a harvesting machine crop tank, the first flange comprising one or more bearings permitting the unloading tube elbow to swivel about a swivel axis and the unloading tube elbow comprising a cranked portion terminating the unloading tube elbow at a second end in an opening, a fixed member adjacent the unloading tube elbow; wherein the unloading tube elbow is connected to the fixed member by a pivot, the pivot having a pivot axis which coincides with the swivel axis, a rotatable drive gear and a motor drivingly engaged therewith for causing rotation of the unloading tube elbow about the swivel axis, wherein a drive gear axis of rotation of the drive gear also coincides with the swivel axis; and wherein the pivot comprises a pivot shaft fixed to the unloading tube elbow and the pivot shaft is journalled relative to the fixed member; and wherein the drive gear is a pinion that is fixed to the pivot shaft.

2. The spout assembly according to claim 1 wherein the fixed member is hollow and the pinion lies inside the fixed member.

3. The spout assembly according to claim 2 wherein the motor comprises one or more output gears that are meshingly engaged with the pinion.

4. A harvesting machine crop unloading spout assembly comprising an unloading tube elbow terminating at a first end in a first flange configured to be secured to an outlet of a harvesting machine crop tank, the first flange comprising one or more bearings permitting the unloading tube elbow to swivel about a swivel axis and the unloading tube elbow comprising a cranked portion terminating the unloading tube elbow at a second end in an opening, a fixed member adjacent the unloading tube elbow; wherein the unloading tube elbow is connected to the fixed member by a pivot, the pivot having a pivot axis which coincides with the swivel axis, a rotatable drive gear and a motor drivingly engaged therewith for causing rotation of the unloading tube elbow about the swivel axis, wherein a drive gear axis of rotation of the drive gear also coincides with the swivel axis; and wherein the motor comprises a double-acting hydraulic rotary actuator.

5. The spout assembly according to claim 4 wherein the rotary actuator is a dual-piston actuator.

6. The spout assembly according to claim 1 wherein the fixed member is a beam that overlies the unloading tube elbow.

7. The spout assembly according to claim 1 wherein the drive gear extends about a periphery of the unloading tube elbow.

8. The spout assembly according to claim 7 wherein the drive gear is a crownwheel extending about the first flange.

9. The spout assembly according to claim 1 in combination with a harvesting machine wherein the spout assembly is connected to a frame of the harvesting machine.

* * * * *